United States Patent [19]

Goodman et al.

[11] 4,290,413
[45] Sep. 22, 1981

[54] SOLAR ENERGY COLLECTOR

[75] Inventors: Ronald D. Goodman, Sylvania; Wallace F. Krueger, Toledo; Anthony R. Shaw, Waterville, all of Ohio

[73] Assignee: Libbey-Owens-Ford Company, Toledo, Ohio

[21] Appl. No.: 76,817

[22] Filed: Sep. 19, 1979

Related U.S. Application Data

[63] Continuation-in-part of Ser. No. 909,204, May 25, 1978, Pat. No. 4,206,748.

[51] Int. Cl.³ .............................................. F24J 3/02
[52] U.S. Cl. .................................. 126/426; 126/448; 126/417; 165/173
[58] Field of Search ............... 126/426, 448, 450, 417, 126/415, 416; 4/493, 498, 499; 165/173

[56] References Cited

U.S. PATENT DOCUMENTS

| 941,150 | 11/1909 | Johnson | 285/252 |
|---|---|---|---|
| 3,242,245 | 3/1966 | Greig et al. | 156/285 X |
| 3,250,660 | 5/1966 | Greig et al. | 156/581 |
| 3,453,666 | 7/1969 | Hedges | 126/415 |
| 3,859,980 | 1/1975 | Crawford | |
| 3,934,323 | 1/1976 | Ford et al. | |
| 3,937,208 | 2/1976 | Katz et al. | 126/448 |
| 4,079,726 | 3/1978 | Voelker | 126/416 X |

FOREIGN PATENT DOCUMENTS

| 2555229 | 6/1977 | Fed. Rep. of Germany | 126/426 |
|---|---|---|---|
| 2731715 | 1/1978 | Fed. Rep. of Germany | |

Primary Examiner—James C. Yeung
Assistant Examiner—Larry Jones
Attorney, Agent, or Firm—Collins, Oberlin & Darr

[57] ABSTRACT

A flexible solar energy collector of unitary, one-piece, self-supporting construction provided with substantially true-round manifolds and secondary manifolds interposed between the primary manifolds and a multiplicity of fluid flow passages extending transversely therebetween. The opposite end portions of the primary manifolds are provided with inserts for reinforcing the same. Means are provided for coupling adjacent collectors together to form an array of such collectors in a solar heat collecting system.

13 Claims, 10 Drawing Figures

SOLAR ENERGY COLLECTOR

CROSS REFERENCE TO RELATED APPLICATION

This application is a continuation-in-part of applicants' prior application, Ser. No. 909,204, filed May 25, 1978, on a Solar Energy Collector with Collapsible Supporting Structure, now U.S. Pat. No. 4,206,748.

BACKGROUND OF THE INVENTION

The present invention relates generally to a solar energy collector and, more particularly, to a lightweight plastic solar energy collector embodying certain novel features therein.

In an effort to reduce dependence on fossil fuel sources of energy, there has recently been increased interest and activity in harnessing the sun's energy as an alternate source of energy. To this end, various types of solar heating units and collectors have been developed, the vast majority of which are of the rigid frame or flat plate type. However, because their costs often are prohibitive in many applications, these rigid collectors have not been entirely successful. As a result, lightweight plastic solar energy collectors have been developed, an example of which is the collector disclosed and claimed in the above-referred to patent application, Ser. No. 909,204. The solar energy collector therein described is formed of a lightweight, unitary, one-piece, plastic construction having a multiplicity of passages extending between inlet and outlet headers or manifolds to distribute the heat transfer medium into multiple thin streams for optimum heat transfer. The present invention constitutes an improvement over the invention described and claimed in the aforesaid patent application, Ser. No. 909,204 by making certain structural improvements in the passages and manifolds of the plastic collector to increase the rigidity thereof, further strengthen the same to resist the pressures and forces encountered in use, minimize mechanical deterioration thereof by avoiding pressure concentrations resulting in flexing and/or bending of the body of the solar energy collector, and to assure more uniform flow distribution to the several passages extending lengthwise of the collector.

SUMMARY OF THE INVENTION

Accordingly, it is a primary object of the present invention to provide an improved plastic solar energy collector which is simple and rugged in construction, low in cost, durable in use, and which can readily withstand the pressures and forces encountered in the heat transfer process.

It is another object of this invention to form the manifolds of the solar energy collector in a true-round configuration offering added strength thereto.

It is still another object of the present invention to provide the foregoing solar energy collector with secondary manifolds facilitating even and uniform distribution of fluid flow into all passages for optimum heat transfer.

It is a further object of this invention to provide the opposite end portions of the manifolds with inserts to reinforce and strengthen the same.

These and other objects, advantages and characterizing features of this invention will become clearly apparent from the ensuing detailed description of an illustrative embodiment thereof, taken together with the accompanying drawings wherein like reference numerals denote like parts throughout the various views.

DESCRIPTION OF THE PREFERRED EMBODIMENT

Figure 1:
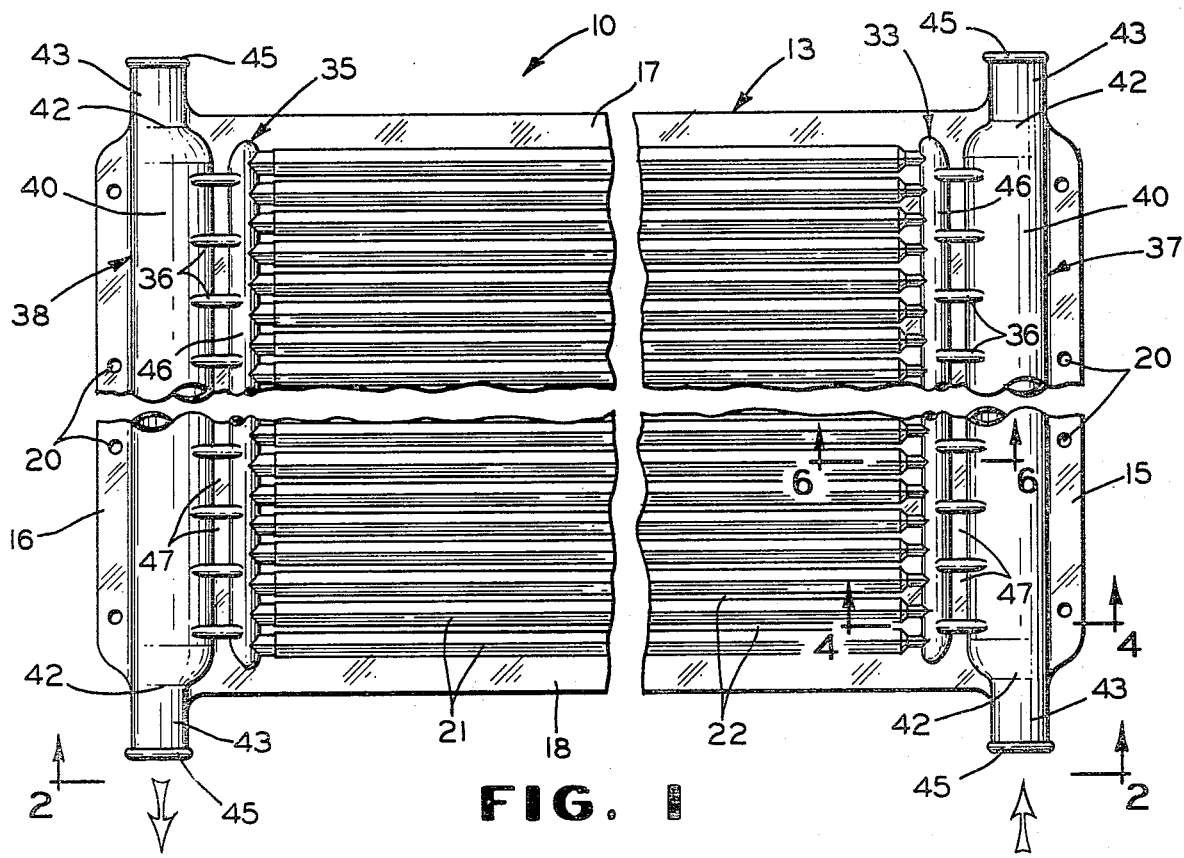
FIG. 1 is a cut-away top plan view of a solar energy collector constructed in accordance with this invention.
Figure 2:
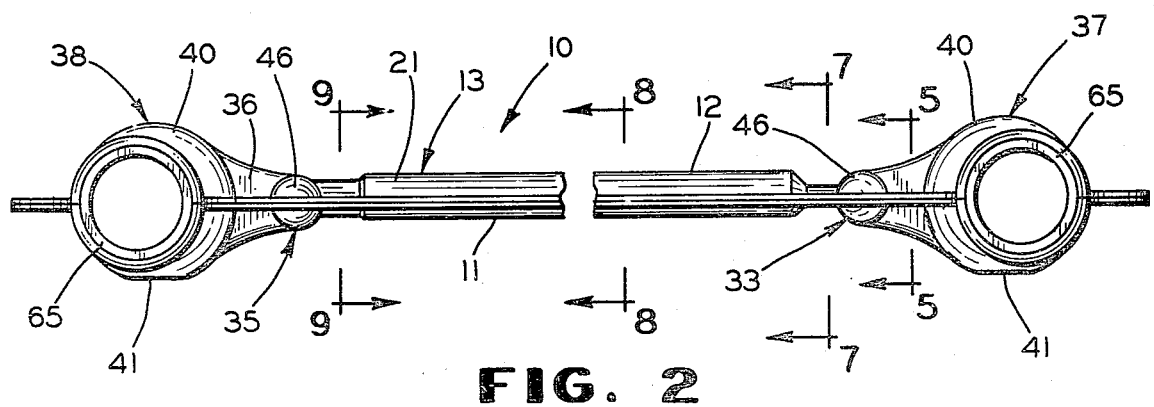
FIG. 2 is a cut-away side elevational view of the collector of FIG. 1, looking in the direction of arrows 2—2 of FIG. 1.

Referring now in detail to the illustrative embodiment depicted in the accompanying drawings, there is shown in FIG. 1 a solar energy collector, comprehensively designated 10, constructed in accordance with this invention and embodying certain novel features of this invention. The solar energy collector 10 preferably is composed of a black plastic material, such as high density linear polyethylene for example. While polyethylene is preferable, it should be understood that the invention is not restricted to the use of such material and any other suitable black, lightweight, high temperature plastic material having similar properties of high heat absorption, durability, good abrasion resistance, and which is capable of withstanding temperature extremes, sunlight, weathering, oxidation and deleterious chemicals without consequent deterioration can be used in lieu of polyethylene, if desired.

Solar energy collector 10 is formed as a substantially rigid, unitary, one-piece construction by a one-step clam shell molding process, such as that disclosed in U.S. Pat. Nos. 3,242,245 and 3,250,660 to James W. Gregg and Marvin H. Cunningham, respectively, whereby a pair of plastic sheets are supported in opposed die members which are functional along with fluid pressure means to deform the sheets against the die faces to impart the desired shape to the sheets. The sheets are fused along their marginal edges to form a hollow plastic structure and which also can be fused along certain desired areas or lines interiorly of the marginal edges to form bridging connections, such as webs, seams and the like, between the two sheets.

The solar energy collector 10 comprises a thin lower sheet member 11 and a thin upper sheet member 12 fused together along their marginal edges to form a unitary, one-piece body 13 having opposed marginal end flanges 15 and 16 and opposed marginal side flanges 17 and 18. Suitable apertures or openings 20 can be formed in flanges 15 and 16 for use in anchoring the collector 10 onto any suitable supporting surface.

It should be appreciated that the clam shell molding process is especially desirable in forming the fused two-sheet plastic collector of this invention in that while the lower sheet 11 should remain black in color for optimum heat absorption, the upper sheet 12 can be of any color desired for architectural aesthetic purposes or for rendering the same compatible with the environment. Also, upper sheet 12 could be translucent, if not transparent, to permit solar radiation penetration therethrough for added efficiency. Moreover, the ability to observe the flow pattern through a translucent or transparent upper sheet member 12 is advantageous in thermally balancing the flow pattern in a large array of such collectors. Thus, forming the collector 10 of this invention of two sheets fused by the clam shell molding process possesses certain advantages not otherwise found in other known plastic molding techniques.

A plurality of laterally spaced, parallel, tubular passages 21 are formed across the width of the body 13 and extend lengthwise thereof to provide conduits for the conveyance of the heat transfer fluid therethrough. Adjacent passages or conduits 21 are spaced from each other by webs 22 formed during fabrication by fusing the moldable plastic sheet members 11 and 12 together along longitudinal junctions or seams. These webs 22 separate adjacent passages 21 and also serve to reinforce the structure to provide self-supporting rigidity and the requisite strength to serve the purpose for which it is designed.

Figure 8:
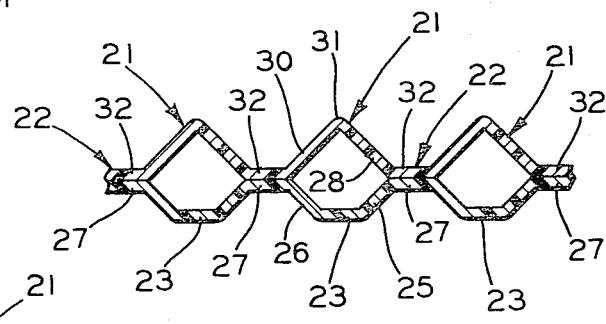
FIG. 8 is a fragmentary vertical sectional view, on an enlarged scale, taken along line 8—8 of FIG. 2.
Figure 9:
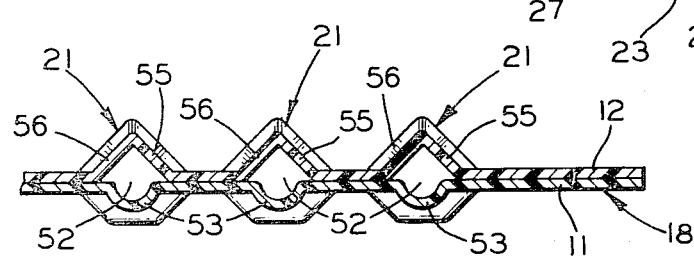
FIG. 9 is a fragmentary, vertical sectional view, on an enlarged scale, taken along line 9—9 of FIG. 2.

As best shown in FIG. 8, each passage 21 is defined by an elongated tubular structure having a bottom wall and a top wall formed from oppositely displaced portions of the lower and upper sheet members 11 and 12. As used herein, the terms upper, lower, top, bottom, vertical, horizontal and the like are applied only for convenience of description with reference to the drawings (FIGS. 4-9) and should not be taken as limiting the scope of this invention. The bottom wall or lower portion of each passage 21 is defined by a planar wall portion 23 having side portions 25 and 26 that slope upwardly at angles in a diverging relation and terminate in a laterally and outwardly directed flange 27 forming the lower half of adjacent webs 22. The top wall or upper portion of each passage 21 is defined by a pair of right angularly related sloping portions 28 and 30 joined at their upper ends in an apex juncture 31 and extending downwardly therefrom at angles in a diverging relation. These sloping portions 28 and 30 terminate at their lower ends in laterally outwardly projecting flanges 32 forming the upper half of adjacent webs 22, the latter being formed by the fused junction of the upper and lower members 11 and 12 during fabrication.

The particular triangular shape of the upper member 12 forming the upper sloping walls 28,30 of passage 21 is significant in presenting the maximum surface area possible for exposure to solar rays. Further, these portions 28 and 30 are sloped downwardly at angles of approximately 45° relative to a true vertical to obtain optimum heat absorption from the sun's rays. Also, the passages 21 are of relatively small cross sectional areas to form the fluid conveyed therethrough into a multiplicity of small streams or rivulets to facilitate optimum heat transfer.

So much of the solar energy collector thus far described is disclosed in the aforementioned copending patent application Ser. No. 909,204. It should be appreciated that while the solar energy collector therein described has admirably served the purpose for which it was intended, it has been found that certain improvements could be made to (1) further ensure even distribution of the heat transfer fluid to the several passages between the manifolds, (2) to increase the strength and rigidity of the collector, and (3) to avoid certain stresses that might shorten the useful life of the collector.

One such improvement in the collector of the present invention resides in the provision of secondary manifolds to better distribute fluid flow uniformly to all passages 21 of the solar collector 10. To this end, the opposite ends of each passage 21 are connected to and merge with secondary headers or manifolds 33 and 35 in turn, communicating via passages 36 with the primary headers or manifolds 37 and 38. The secondary manifolds 33,35, as well as the primary manifolds 37,38, are located adjacent the opposite ends, respectively, of the collector body 13, and extend substantially perpendicularly to the passages 21. For purposes of this description, the manifolds 33 and 37 are the inlet manifolds for distributing or delivering fluid to the passages 21 and manifolds 35 and 38 are the outlet manifolds for collecting and removing the heated fluid from passages 21. The secondary manifolds 33,35 facilitate even and uniform fluid distribution to and through all passages 21, as will hereinafter be more fully explained, and are especially significant when an array of collectors 10 are connected in series in a fluid circulating system.

Another significant feature of the present invention resides in forming the primary manifolds 37 and 38 circular in cross section in order to provide the requisite strength for better withstanding the internal pressures that build-up during use. To this end, the primary manifolds 37 and 38, which are identical in construction and mirror images of each other, each comprises an elongated, hollow, cylindrical body 40 of generally circular configuration (FIG. 4) in cross section. While a minor portion of the cylindrical body 40 at the bottom thereof is flattened, as at 41, to generally conform to a planar supporting surface, and to provide a slightly larger bearing surface for stabilizing the collector on its supporting surface, the major portion of the body 40 is of a true-round or circular configuration and offers substantially all of the advantages attributed to a true-round conduit; specifically, greater strength and resistance to the pressures encountered during use. The opposite ends of body 40 are provided with radially inwardly converging neck portions 42 which merge into reduced diameter end portions 43 of cylindrical shape or circular cross sectional configurations. These end portions 43 are provided with annular beads 45 and can be suitably connected to a piping system or the end portions 43 of adjacent solar energy collectors 10 by coupling means as will be hereinafter described.

The secondary manifolds 33 and 35 also are identical in construction and mirror images of each other. Each secondary manifold comprises an elongated hollow body 46 of generally circular cross section (FIG. 6) and is closed at its opposite ends. The opposite ends of the secondary manifolds 33 and 35 project past the two outermost passages 21.

Figure 4:
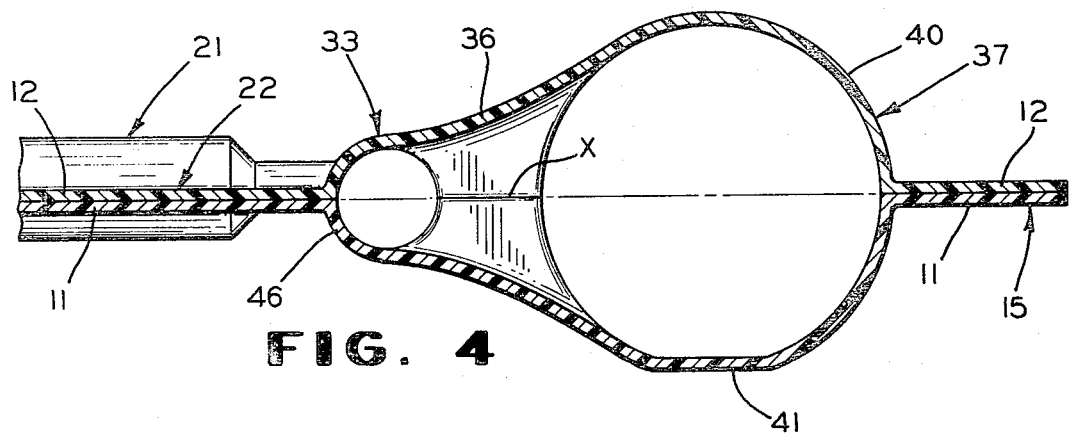
FIG. 4 is a fragmentary vertical sectional view, on an enlarged scale, taken along the line 4—4 of FIG. 1.
Figure 5:
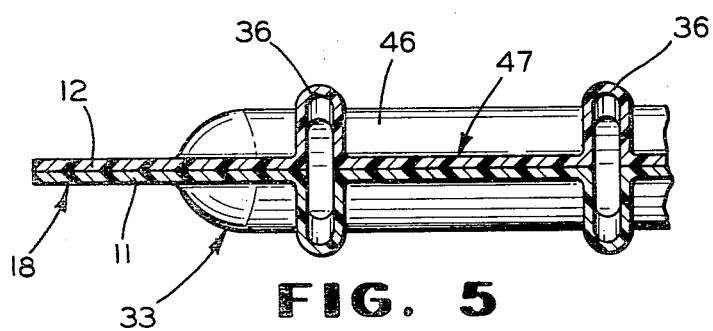
FIG. 5 is a fragmentary vertical sectional view, on an enlarged scale, taken along line 5—5 of FIG. 2.
Figure 6:
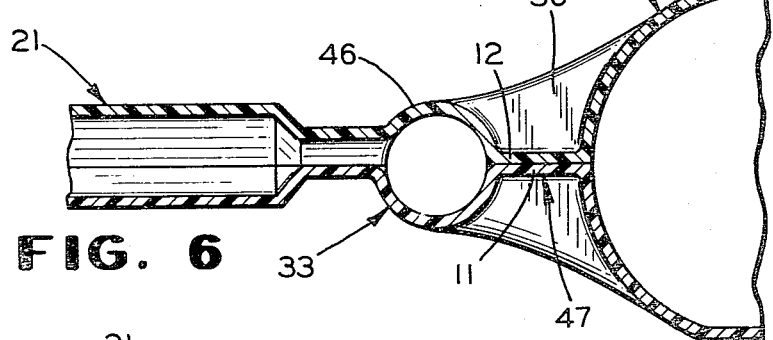
FIG. 6 is a fragmentary, vertical sectional view, on an enlarged scale, taken along the line 6—6 of FIG. 1.
Figure 7:
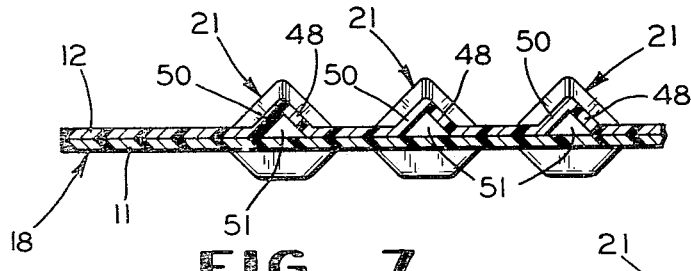
FIG. 7 is a fragmentary vertical sectional view, on an enlarged scale, taken along line 7—7 of FIG. 2.

As earlier noted, the primary manifolds 37,38 are connected to the secondary manifolds 33 and 35 by passages 36. These passages 36 have elongated vertical dimensions and relatively narrow horizontal dimensions (FIG. 5) and are reduced in cross sectional area progressively from the primary manifolds to their associated secondary manifolds (FIG. 4). Adjacent passages 36 are laterally spaced from each other by webs 47 formed during fabrication by fusing the moldable plastic sheet members 11 and 12 together between the passages 36. These webs 47 separate adjacent passages 36 and also serve to reinforce the structure and thereby further promote self-supporting rigidity thereof.

It should be appreciated that in order to obtain optimum heat transfer, there should be uniform fluid flow through all passages 21 of the solar energy collector 10. In order to foster such uniform fluid flow through the many passages 21 and, especially when an array of collectors 10 are connected in a solar energy collecting system, means are provided at the inlet end of each passage 21 for restricting fluid flow therethrough. To this end, the lower sheet 11 defining the bottom wall of each passage 21 is not displaced at the inlet end thereof while the upper sheet 12 is displaced upwardly only slightly to form sloping wall portions 48 and 50 (FIG. 7) and to define with lower sheet 11 a restricted opening 51 of generally triangular cross section. These restrictions 51 in passages 21 promote even volume distribution thereto and uniform flow therethrough, regardless of the number of collectors 10 employed in a modular solar energy collecting system.

The outlet end of each passage 21 also is provided with a restricted opening 52 formed from oppositely displaced portions of the lower and upper sheet members 11 and 12 to define a curved, trough-shaped bottom wall 53 and upper sloping wall portions 55 and 56. While the outlet restricted opening 52 is of smaller cross sectional area than the major portion of passage 21, it is substantially larger than the cross sectional area of inlet restricted opening 51 so as not to generate back pressures in the passages 21, nor interfere with the inlet restriction's function of promoting uniform flow through the passages 21.

While it is recognized that aforementioned U.S. patent application Ser. No. 909,204 discloses restricted inlet openings and that the function thereof is to facilitate uniform fluid flow through the passages, it has been found that such result is not always obtained with primary feeder inlet manifolds only, particularly when the cross sectional area of the manifold is not constant throughout. The reason for this is that it is difficult to achieve the necessary head in such manifolds to effect uniform distribution of fluid flow to the restricted inlet openings of the passages 21. This problem is further compounded when an array of collectors are connected in a solar energy collecting system.

Accordingly, an important feature of the present invention resides in the provision of the hereinbefore described secondary manifolds, which are of uniform cross section throughout and substantially smaller than the primary manifolds, the latter also serving as part of the supply piping system. The smaller, somewhat isolated secondary manifolds can accumulate a head along their entire lengths to promote the desired even flow distribution to all restricted inlet openings 51 and thereby uniform flow through all passages 21. These secondary manifolds 33 and 35 are fed from their associated primary manifolds 37 and 38, respectively, via passages 36 and are maintained substantially full or at least with a sufficient volume of fluid along their entire lengths to assure uniform, even distribution to and through passages 21.

Still another improvement of this invention over the solar energy collector disclosed in patent application Ser. No. 909,204 is in directing cross flow from and to primary headers 37 and 38 radially and centrally thereof. Where the cross passages communicate with the manifolds at locations offset from the central axes thereof, as in the above copending patent application, it was found that under certain pressurized conditions, the flexible collector body had a tendency to flex or bend adjacent the juncture of such passages with their associated manifolds, thereby weakening the collector and sometimes shortening its useful life. As shown in FIG. 4, each passage 36 communicates with the primary manifold radially and centrally thereof, i.e. the axes of passages 36 and manifold 37 reside in a common plane, identified by the reference character X. This assures pressure equilibrium and avoids the possible flexing or bending of the collector adjacent to the manifold as could otherwise occur if communication to the manifold were offset from the central axis thereof.

Figure 10:
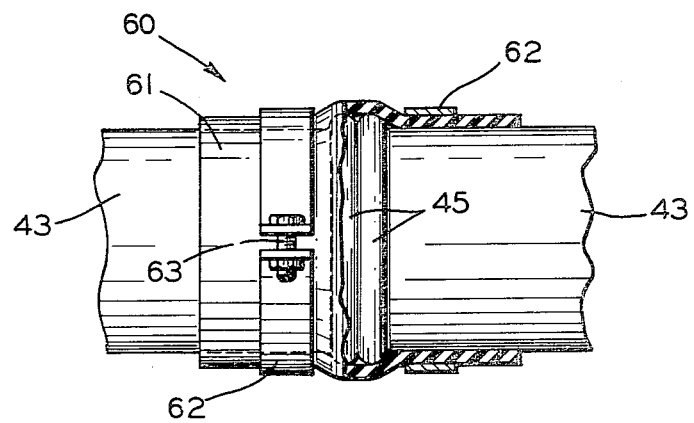
FIG. 10 is a fragmentary elevational view, partly in section, on an enlarged scale, showing the connecting means for coupling solar energy collectors together.
Figure 3:
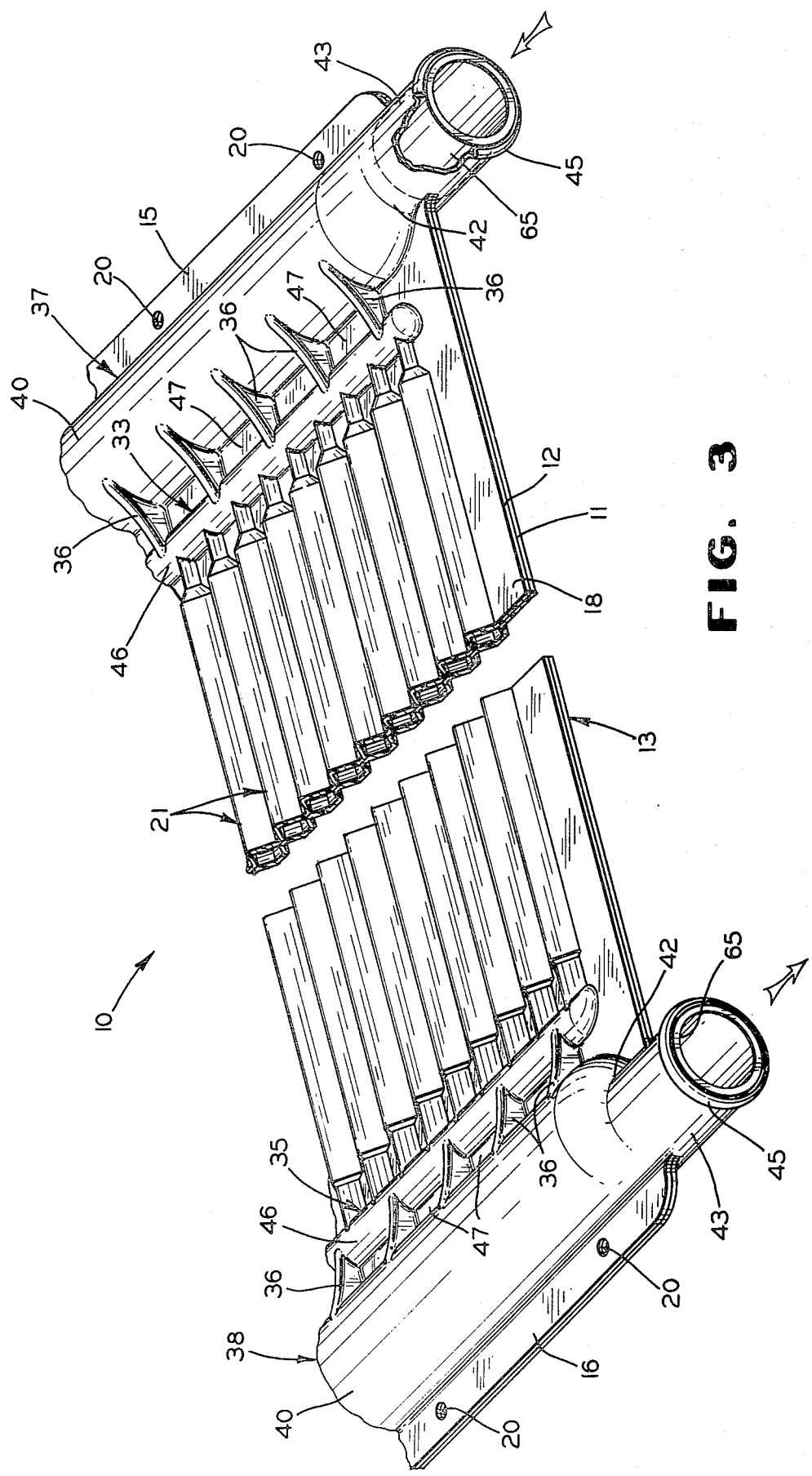
FIG. 3 is a fragmentary, cut-away perspective view of the collector of FIG. 1, showing the manifold inserts used in conjunction with this invention.

The solar energy collector 10 of this invention can be used singularly or in combination with a plurality of similar solar energy collectors 10 connected in series by coupling means, generally designated 60 (FIG. 10), to form a modular solar energy collection array or system. The coupling means 60 preferably includes a connecting rubber sleeve 61 having an inside diameter slightly larger than the outside diameter of adjacent manifold end portions 43 for encompassing the same. A pair of clamps 62 are disposed about the sleeve 61 adjacent manifold end portions 43 and are tightened or relaxed, as required, by suitable fasteners 63. Of course, other coupling arrangements may be substituted for the preferred coupling means 60 described above, if desired.

It has been found that the clamping force exerted by clamps 62 sometimes damage and/or at least partially collapse the manifold end portions 43, seriously impeding proper fluid flow therethrough. In order to reinforce these manifold end portions 43, inserts 65 are provided therein. These inserts 65 are of cylindrical configuration and are inserted within the manifold end portions 43 immediately after the collector body 13 has been formed by the heretofore mentioned clam shell molding process in order to be rigidly secured in position by a shrink fit. The insert 65 can be formed of the same material as the collector body 13 or any other suitable rigid plastic material having the requisite rigidity and strength to resist collapsing upon the application of a clamping or radially inwardly directed force.

While not limited thereto, the solar energy collector 10 of this invention, or an array of any number of such collectors 10, preferably is used to heat or elevate the temperature of water in swimming pools. The solar energy collectors 10 of the present invention are especially suited for this purpose because of their ability to heat large volumes of water by small temperature increases by recycling the water in thin rivulets or streams through the passages 21 formed between the relatively thin sheet members 11 and 12 of black plastic material. Any number of solar collectors 10 can be employed in an array, as determined by the size and area of the swimming pool and the volume of water to be heated. Such an array may be supported on the roof of a building, a ground or deck surface, or on any convenient surface exposed to direct sunlight, as desired.

In operation, fluid is pumped through the primary inlet manifold 37, or the several inlet manifolds 37 of serially connected collectors 10. In each collector 10, the fluid flows radially from the inlet manifold 37 through passages 36 into the secondary manifold 33.

The passages 36 progressively diminish in depth and, consequently cross section, from primary manifold 37 to the secondary manifold 33 and are of sufficient capacity or volume collectively to quickly fill the secondary manifold 33. This provides the necessary volume or head in secondary manifold 33 to evenly distribute the fluid to all passages 21 and, in conjunction with the restricted inlet openings 51 of the latter, ensure even, uniform fluid flow to all passages 21 of either a single collector 10 or any number of serially connected collectors 10. Normally, the primary inlet manifold 37 is maintained at a lower elevation than the primary outlet manifold 38 in use to cause the fluid to flow upwardly through the passage 21 at substantially the same rate of flow. The solar heat energy absorbed by the corrugated upper sheet member 12 is transmitted to the fluid passing through passages 21 and then conveyed via secondary and primary outlet manifolds 35 and 38 to a piping system delivering the heated fluid to a storage area or any desired facility for heating purposes.

From the foregoing, it is apparent that the objects of the present invention have been fully accomplished. An improved solar energy collector of lightweight, one-piece construction is provided for transmitting solar heat to a heat transfer medium flowing through the collector in an improved and more efficient manner. Forming the primary manifolds of a true-round configuration increases the strength and rigidity thereof to better withstand the pressures and crushing forces encountered during use. The provision of secondary manifolds, fed by passages communicating with the primary manifolds, in conjunction with restricted openings at the inlets of the several passages traversing the collector, assures even flow distribution to and uniform flow through all passages 21. Establishing communication of cross flow centrally of the primary manifolds minimizes, if not completely avoids, pressure concentration adjacent the junctures of the passages and manifolds to prevent undesirable flexing adjacent such manifolds. Reinforcing the opposite end portions of the collector by the provision of inserts resists radial deformation and possible collapse thereof to maintain the same in a true-round condition and facilitate smooth and even fluid flow therethrough.

It is to be understood that the form of the invention herein shown and described is to be taken as an illustrative embodiment only of the same, and that various changes in the shape, size and arrangement of parts may be resorted to without departing from the spirit of the invention.

We claim:

1. A solar energy collector comprising: a body formed of plastic material in a one-piece unitary construction having a primary inlet and outlet manifold at the opposite ends thereof, respectively, and a multiplicity of elongated, laterally spaced parallel passages extending in a direction generally normal to said primary inlet and outlet manifolds to provide cross fluid flow paths therebetween, and secondary inlet and outlet manifolds parallel to said primary manifolds, respectively, said secondary manifolds interposed between said primary manifolds and said passages, said secondary and primary manifolds being interconnected by a plurality of cross passages for fluid flow, each of said cross passages tapering in cross-sectional area from the primary to the secondary manifold.

2. A solar energy collector according to claim 1, wherein said body is formed of a pair of sheet members fused together along laterally spaced lines substantially lengthwise of said body to form elongated webs between said passages, each of said passages being formed by oppositely displaced portions of said sheet members between said webs and defined by an upper wall formation above said web and a lower wall formation below said web.

3. A solar energy collector according to claim 1, wherein said primary and outlet manifolds each comprise an elongated hollow body of substantially circular configuration in cross section.

4. A solar energy collector according to claim 3, wherein said manifold hollow body terminates in reduced diameter opposite end portions having annular beads, said hollow body converging toward said reduced diameter end portions.

5. A solar energy collector according to claim 4, including inserts mounted within said opposite end portions, respectively, with a shrink fit.

6. A series of solar energy collectors according to claim 4, including means coupling said primary manifolds to associated primary manifolds of adjacent solar energy collectors to form a solar energy collection system.

7. A solar energy collection system according to claim 6, wherein said coupling means comprises a flexible sleeve overlying the primary manifold end portions of adjacent solar energy collectors, and means overlying said sleeve outwardly of said annular beads for clamping said sleeve about the manifold end portions of adjacent solar energy collectors.

8. A solar energy collector according to claim 1, wherein said secondary manifolds are substantially smaller than said primary manifolds to be maintained substantially filled thereby with fluid so as to promote even distribution of such fluid to all first mentioned passages.

9. A solar energy collector according to claim 1, wherein said primary manifolds and said secondary manifolds have axes, respecitively, lying in a common plane.

10. A solar energy collector according to claim 1, wherein said body is formed of a pair of sheet members fused together by a clam shell molding process.

11. A solar energy collector according to claim 10 wherein one of said sheet members is formed of a black plastic material and the other sheet member is formed of a non-black plastic material.

12. A solar energy energy collector according to claim 11, wherein said other sheet member is formed of a translucent plastic material.

13. A solar energy collector comprising: a body formed of plastic material in a one-piece unitary construction having a primary inlet and outlet manifold at the opposite ends thereof, respectively, and a multiplicity of elongated, laterally spaced parallel passages extending in a direction generally normal to said primary inlet and outlet manifolds to provide cross fluid flow paths therebetween, and secondary inlet and outlet manifolds parallel to said primary manifolds, respectively, said secondary manifolds interposed between said primary manifolds and said passages and establishing communication therebetween, said body being formed of a pair of sheet members fused together along laterally spaced lines substantially lengthwise of said body to form elongated webs between said passages, each of said passages being formed by oppositely displaced portions of said sheet members between said webs and defined by an upper wall formation above said web and a lower wall formation below said web, and an inlet restriction adjacent at least one end of each passage formed by maintaining the lower wall in the same plane as said web thereby reducing the cross sectional area of said passage.

* * * * *